United States Patent [19]

Williams et al.

[11] Patent Number: 5,290,489
[45] Date of Patent: Mar. 1, 1994

[54] APPARATUS AND METHOD FOR TREATING THE INTERIOR SURFACES OF HOLLOW PLASTIC OBJECTS FOR IMPROVING ADHESIVE PROPERTIES

[75] Inventors: R. Lee Williams, 2349 C Menard St., St. Louis, Mo. 63104; Christine A. Mueller, St. Louis, Mo.

[73] Assignee: R. Lee Williams, St. Louis, Mo.

[21] Appl. No.: 904,202

[22] Filed: Jun. 25, 1992

[51] Int. Cl.⁵ .............................................. B29C 71/04
[52] U.S. Cl. .................................... 264/22; 156/272.6; 264/571; 264/83; 264/101; 422/186.05; 425/174; 425/174.8 R
[58] Field of Search ............. 264/22, 40.1, 40.2, 264/83, 82, 101, 102, 571; 425/174, 174.8 R, 174.8 E; 250/324; 156/272.6; 422/186.05

[56] References Cited

U.S. PATENT DOCUMENTS

| | | | |
|---|---|---|---|
| 2,892,733 | 6/1959 | Gardner et al. | 264/83 |
| 3,057,795 | 10/1962 | Frohlich | 422/186.05 |
| 3,157,785 | 11/1964 | Dobson et al. | 250/324 |
| 3,183,352 | 5/1965 | Brandt et al. | 250/324 |
| 3,428,801 | 2/1969 | Leach et al. | 250/324 |
| 4,315,808 | 2/1982 | Imada et al. | 264/83 |
| 4,317,788 | 3/1982 | Imada et al. | 264/83 |
| 4,511,419 | 4/1985 | Kuhlmann et al. | 156/272.6 |
| 4,701,290 | 10/1987 | Eschwey et al. | 264/83 |

FOREIGN PATENT DOCUMENTS

| | | | |
|---|---|---|---|
| 0250798 | 1/1988 | European Pat. Off. | 264/22 |
| 60-48336 | 3/1985 | Japan | 264/22 |
| 61-204237 | 9/1986 | Japan | 264/22 |
| 62-15233 | 1/1987 | Japan | 425/174 |
| 62-15234 | 1/1987 | Japan | 425/174 |

*Primary Examiner*—Jeffery Thurlow
*Attorney, Agent, or Firm*—Frank B. Janoski

[57] ABSTRACT

Apparatus and method for treating the interior surfaces of hollow plastic objects to improve their adherency to and compatibility with another component, such as polyurethane foam. The invention consists of creating a vacuum in the object and drawing a conductive gas inside the object. A pair of electrodes are spaced apart from each other, and a source of electricity is provided thereto of sufficient intensity to produce an electrical discharge across the gap between the electrodes when an object is in the gap between the electrodes. The electrodes are arranged with regard to the size and configuration of the object to provide ionization of the conductive gas inside the object to surface treat the inner walls.

12 Claims, 6 Drawing Sheets

APPARATUS AND METHOD FOR TREATING THE INTERIOR SURFACES OF HOLLOW PLASTIC OBJECTS FOR IMPROVING ADHESIVE PROPERTIES

BACKGROUND OF THE INVENTION

This invention relates to the apparatus and method for surface treating the interior surfaces of hollow plastic objects to increase the surface tension level of the interior surfaces thereby improving the adhesive properties of these surfaces. More particularly, the apparatus and method by which interior surfaces are treated by creating a vacuum inside a hollow object, introducing a suitable gas therein and using an electrical discharge to ionize the gas to improve the surface tension and thereby the adhesive ability of the interior surfaces.

Adhesion of any substance (such as coatings, foams, glues, etc.) to the interior walls of hollow plastic objects (such as rotational molded parts, blown molded parts, etc.) has been a problem due to low surface energy level (surface tension) inherent in most plastics. The ability to adhere a substance to the interior walls of hollow plastic objects is highly desirable in numerous instances, such as foam insulation for strength of the object and insulation or coatings to make the interior surfaces less permeable to various products. For instance, it has been particularly difficult to adhere polyurethane foams of the standard types (using cloroflorocarbons (CFC) and hydrocloro-florocarbons (HCFC)) to the interior surfaces of hollow plastic objects. The introduction of poly foams with reduced CFC's or without CFC's (such as water borne foams) has proven particularly difficult to adhere to the interior surfaces without proper surface treatment. Standard methods of surface treatment (such as flame treating or corona discharge) have required that the plastic object be of two piece construction and that the interior surfaces of the objects be treated prior to final assembly. Other methods, such as gas plasma also have proven marginally effective in treating completely the interior surfaces. In addition, the aforementioned methods have proven to be costly and it has been difficult to treat irregularly shaped surfaces.

SUMMARY OF THE INVENTION

Among the several objects of the present invention may be noted the provision of an improved apparatus and method for treating the interior surfaces of hollow plastic objects for improving the surface tension and thereby the adhesive properties; the provision of such apparatus and method which permits the surface treatment of the interior surfaces after the object has been completely assembled; the provision of such apparatus and method which effectively treats the interior surfaces of a one piece hollow plastic object; the provision of such an apparatus and method which will uniformly treat all of the interior surfaces of a hollow plastic object regardless of surface irregularities, corners, angles, concave or convex areas, etc., even on irregular or difficult to surface treat hollow plastic objects; the provision of such apparatus and method which permits simultaneous treatment of the interior and exterior surfaces of the object being treated; the provision of such apparatus and method which requires a minimum of labor, equipment and product preparation; the provision of such apparatus and method which preserves the cosmetic appearance of the object to be surface treated; and the provision of such apparatus and method which is easy to use, safe, and which permits the surface treatment to be completed as rapidly as possible with minimum cost.

Briefly, the apparatus and method of this invention for surface treating the interior surfaces of hollow plastic objects for improving its surface tension and thereby its adhesive properties comprises means for creating a partial vacuum in the hollow plastic object and means for drawing a conductive gas or gas mixture inside the object. The apparatus further comprises a pair of electrodes spaced apart from each other, means including a source of electricity of sufficient intensity to produce ionization of the gas inside the hollow plastic object when the hollow plastic object is placed between the electrodes, electrical conducting means connecting the electrodes and the source, and means for positioning the object in the gap between the electrodes.

The method of this invention for surface treating the interior surfaces of hollow plastic objects to improve the surface tension of the interior surfaces comprises creating a partial vacuum in the object, drawing a conductive gas inside the object and positioning the object between a pair of electrodes spaced apart from each other. The source of electricity supplies sufficient intensity to ionize the gas inside the object, thereby increasing the surface tension of the interior surfaces providing adhesive ability between any substance and the interior surfaces of the object.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
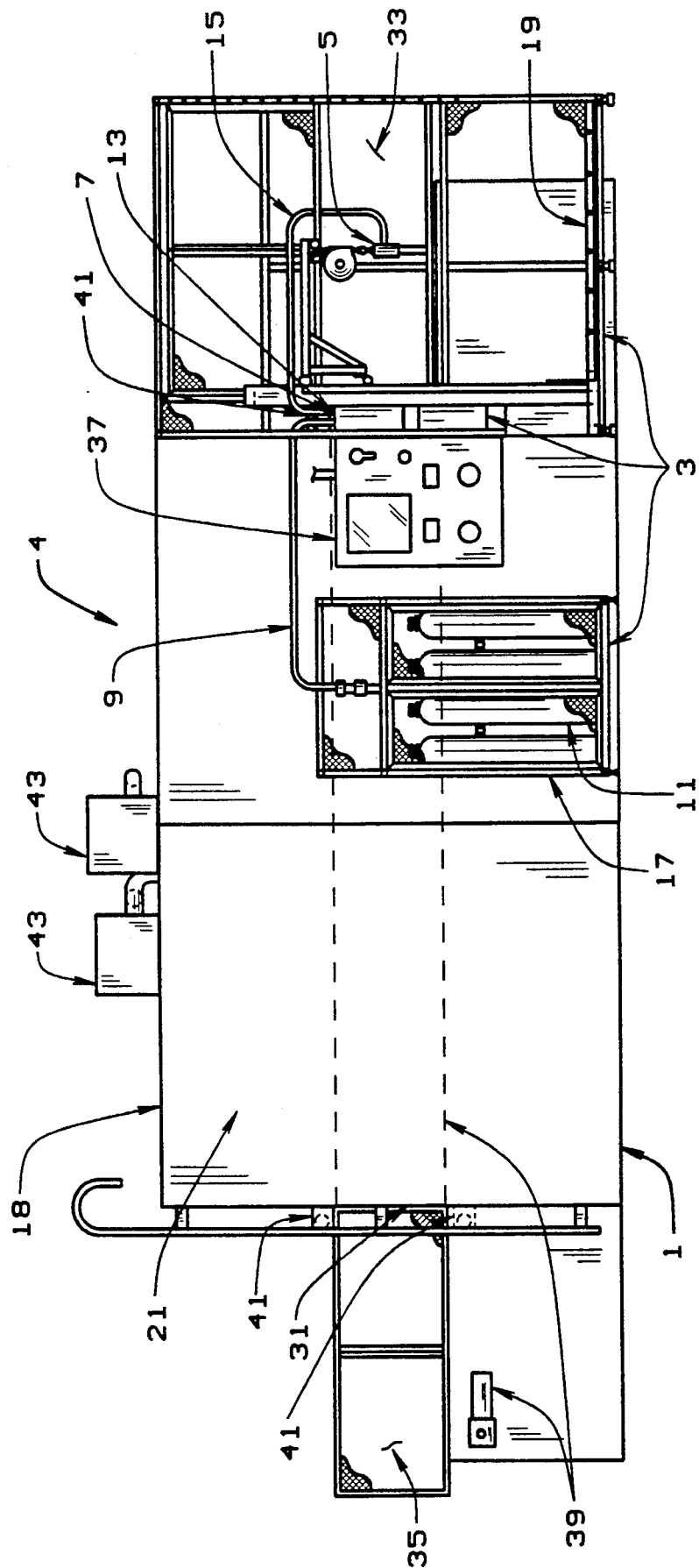
FIG. 1 is a frontal view of one form of the apparatus embodying the invention.

Referring now to the drawings, apparatus for treating the interior surfaces of hollow plastic objects for improving the surface tension and thereby the adhesive properties is generally indicated at 1. The apparatus 1 comprises gas/vacuum means 3 and surface treater apparatus 4.

Figure 2:
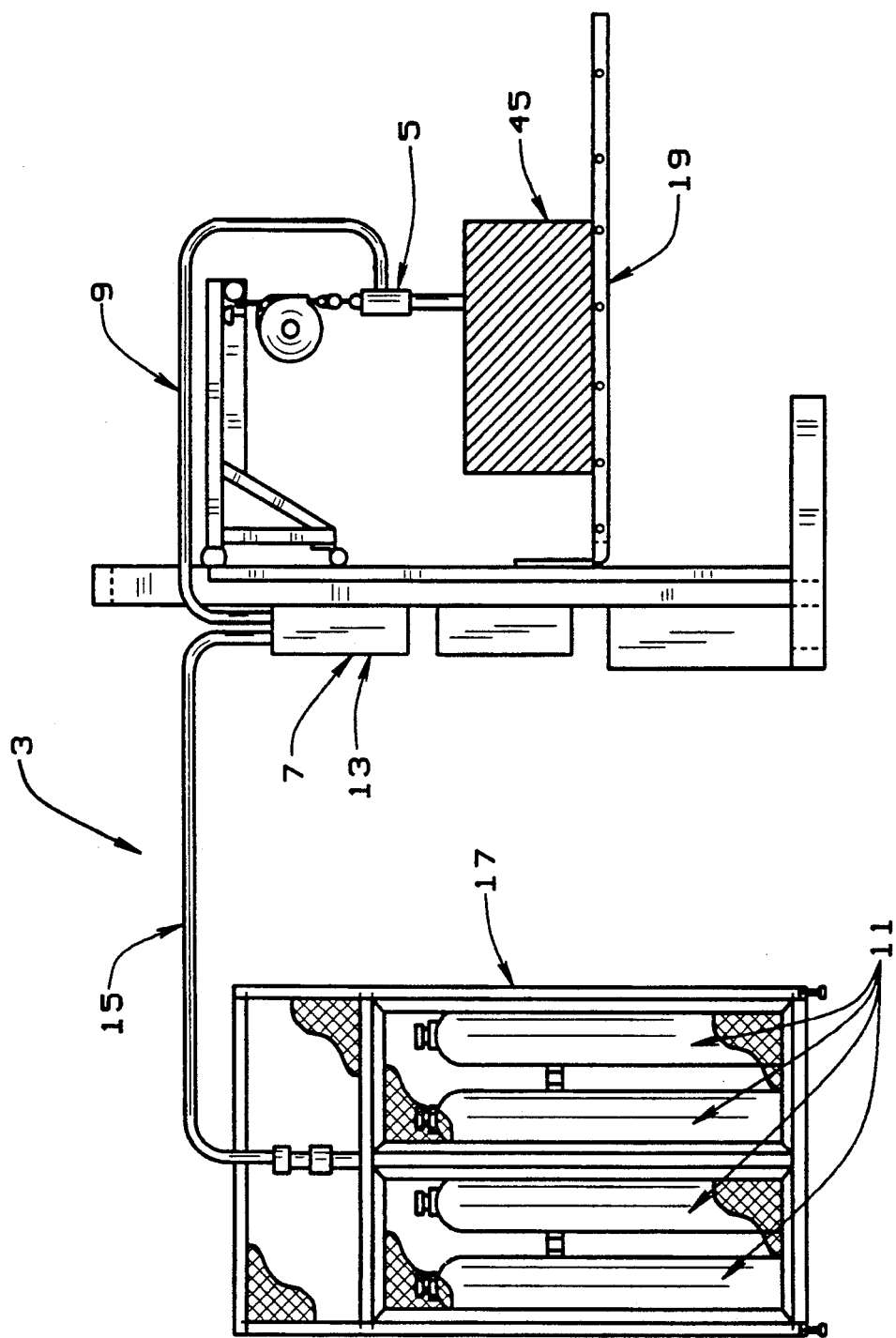
FIG. 2 is an enlarged frontal view of the gas/vacuum apparatus of FIG. 1.
Figure 3:
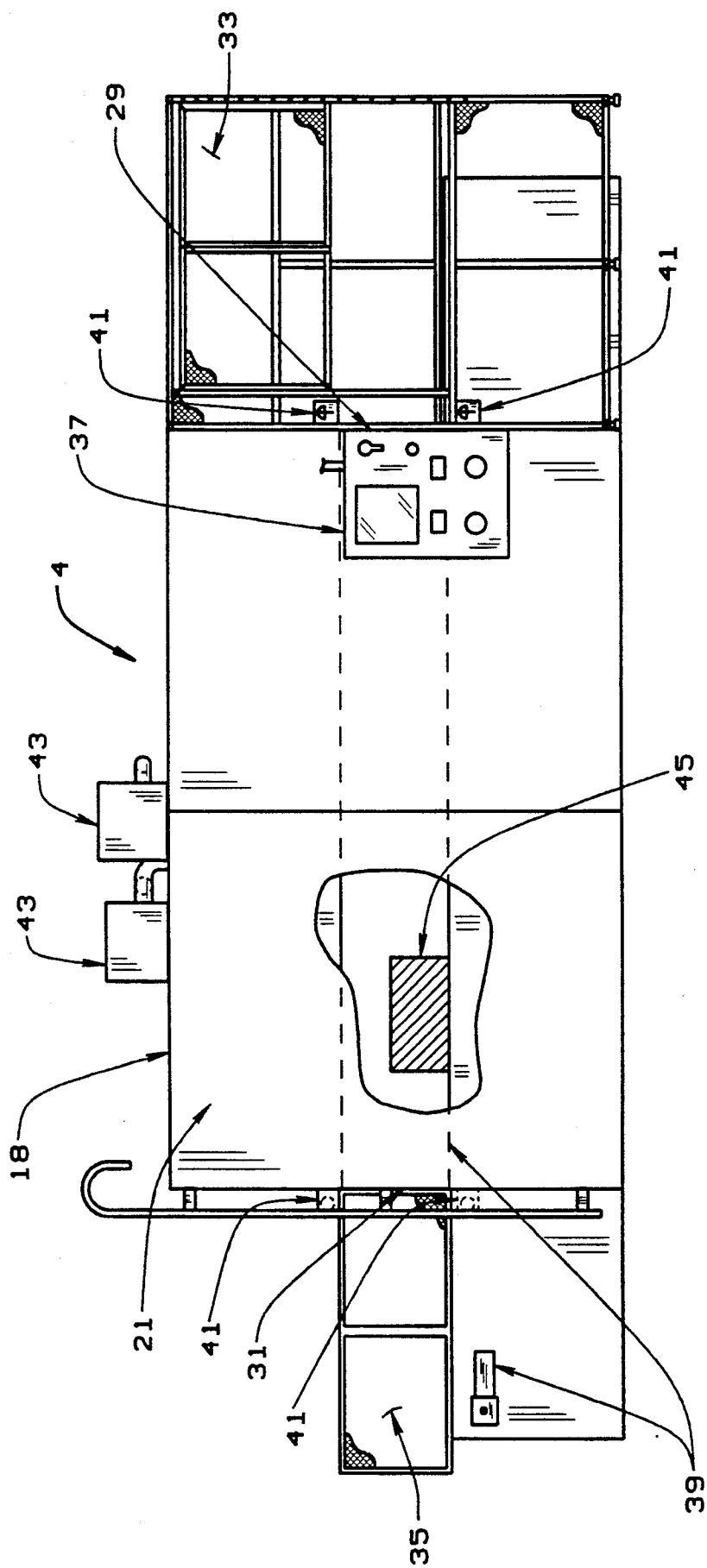
FIG. 3 is a frontal view of the surface treater apparatus of FIG. 1.
Figure 4:
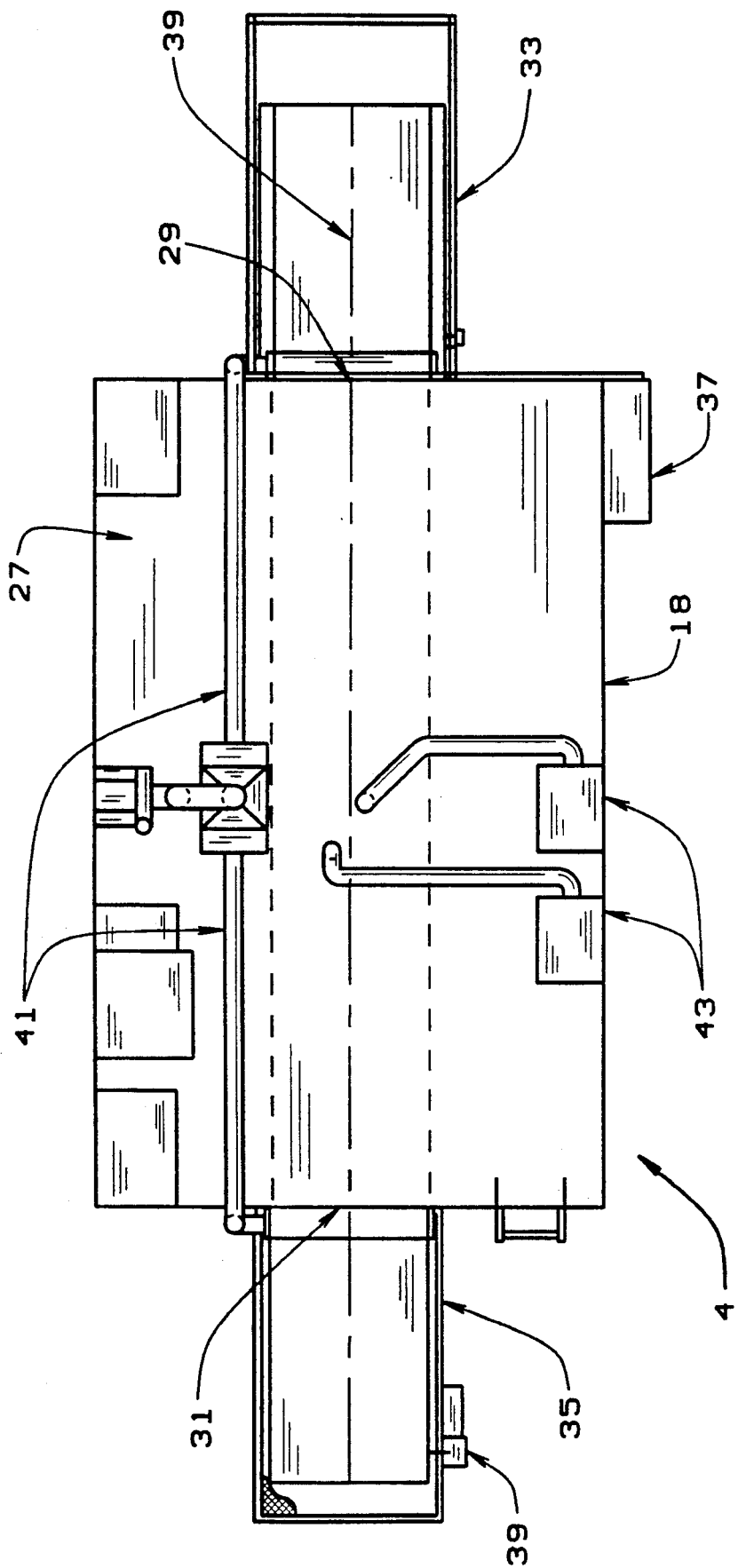
FIG. 4 is a top view of the surface treater apparatus of FIG. 1.
Figure 5:
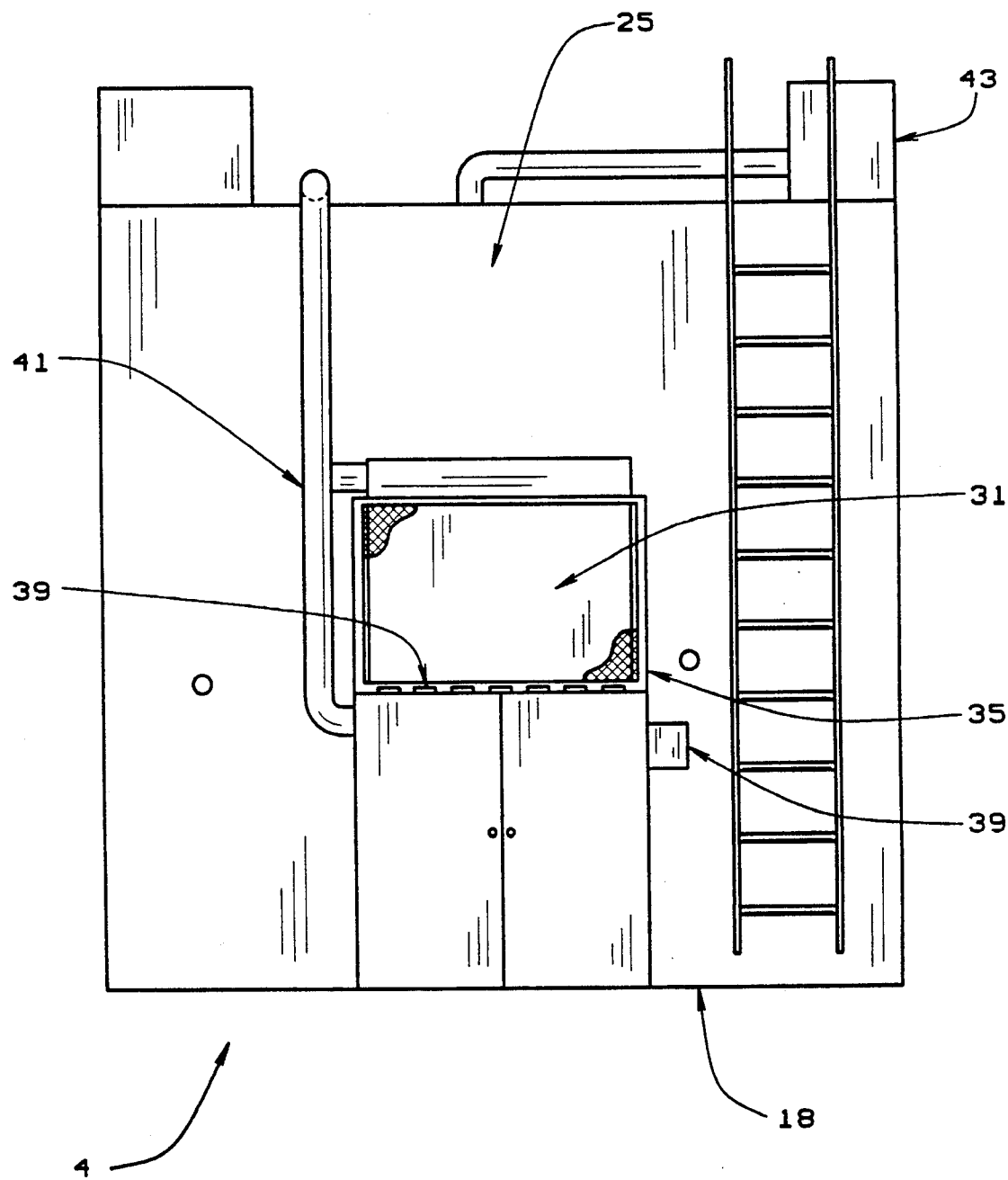
FIG. 5 is one side view of the surface treater apparatus of FIG. 4.
Figure 6:
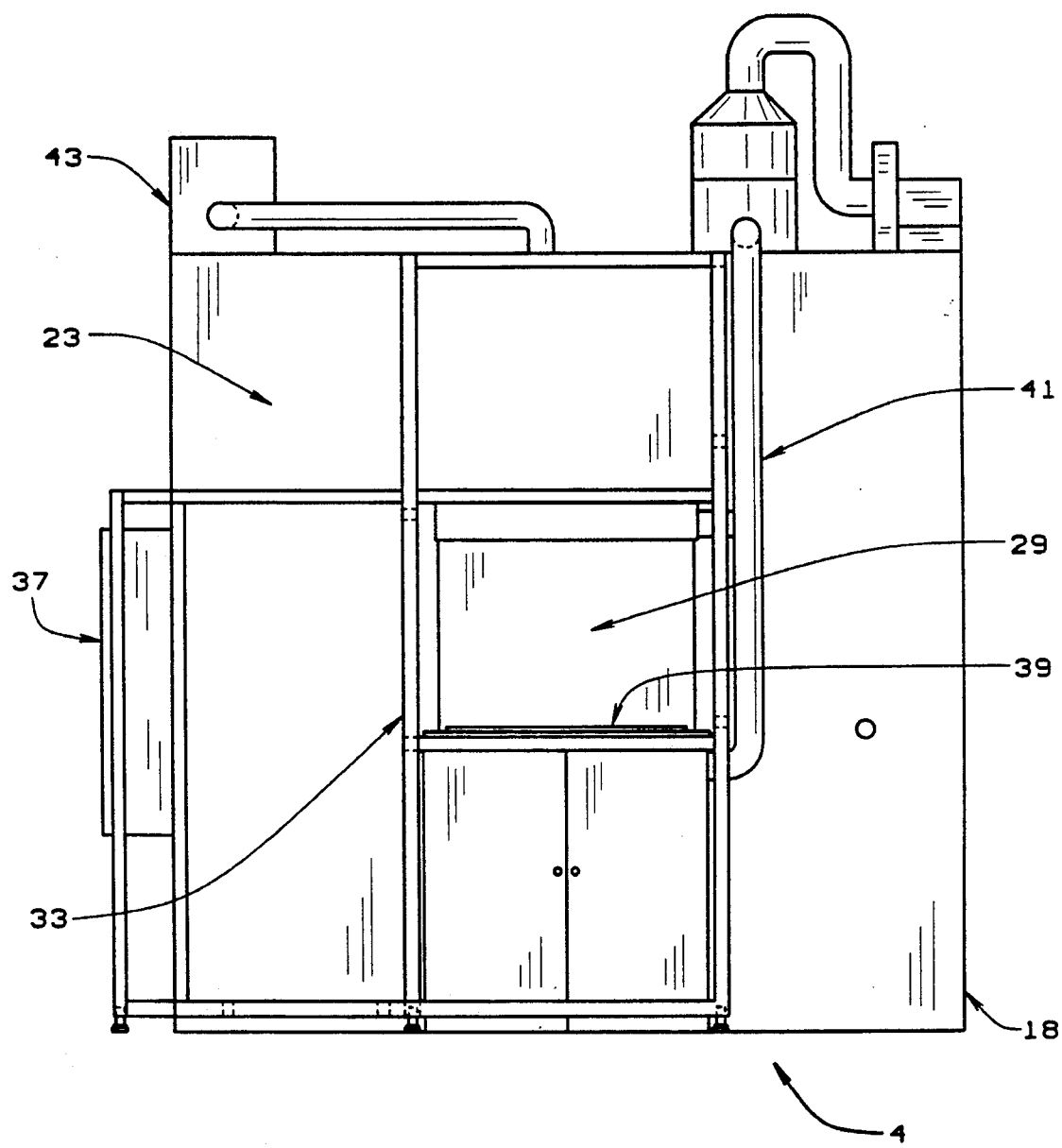
FIG. 6 is the other side view of the surface treater apparatus of FIG. 4.

The gas/vacuum means 3 includes means for creating a partial vacuum in a hollow plastic object and means for drawing a conductive gas or gas mixture inside a hollow plastic object. As best shown in FIG. 2, the partial vacuum means consists of a sealing head 5 and a vacuum generator 7. The sealing head and vacuum generator are connected by suitable tubing 9. The means for drawing a conductive gas or gas mixture consists of tanks 11 of a gas mixture connected to control valves 13 by suitable tubing 15 and then connected to the sealing head 5. It will be understood by those familiar in the art that other such configurations may be used for this invention.

As shown in FIG. 2, the tanks 11 of gas mixture are placed in suitable caging 17 for storage and safety purposes. In addition, a lift mechanism 19 is provided adjacent to the sealing head of the vacuum means for reasons that will be apparent later. The lift mechanism can be either electrical, hydraulic or mechanical.

Turning now to the surface treater apparatus shown generally in FIGS. 3-6 (a detailed description of this apparatus can be found in U.S. Pat. No. 3,428,801, issued Feb. 18, 1969, is incorporated herein and therefor will not be repeated herein), the apparatus consists of a housing or cabinet 18 having sheet metal walls 21, 23, 25, 27, and an entrance opening 29 and exit opening 31 in either end thereof, a safety gate/cage mechanism 33 at the opening for the apparatus and a second safety gate/cage mechanism at the exit 35. The housing has mounted on the exterior surface a control panel 37 for operation of the surface treater apparatus. However, it will be understood that the control panel can be located at other positions on the apparatus or can even be remote to the apparatus. There is located within the apparatus a conveyor system 39 for moving objects through the housing as will be discussed later.

Although not shown in the drawings, but as will be understood by those familiar in the art and which may be referred to in U.S. Pat. No. 3,428,801, this apparatus has two treatment chambers. One of the treatment chambers has surface electrodes horizontally positioned, parallel to the conveyor belt and above and below the conveyor belt. These electrodes are spread from each other a sufficient distance to permit passage of hollow plastic objects between them for interior and/or exterior treatment. This chamber has a vertical electrical discharge. Again, for further detail of this apparatus, reference may be made to U.S. Pat. No. 3,428,801.

The second chamber has a pair of surface electrodes positioned for horizontal electrical discharge. However, it will be understood that this invention may be performed with only one pair of electrodes.

The housing also has exhaust plenums 41 for the removal of ozone gas from the electrical discharge tunnel. The plenums carry unwanted gases from the housing for suitable handling. It will be understood that removal of these gases is accomplished by an exhaust blower and motor. Also found on the housing are tunnel desiccant dehumidifiers 43. These dehumidifiers help keep the tunnel atmosphere dehumidified to maintain and cool the electrodes and maximize surface treatment ability.

Safety gates/cages 33 and 35 are positioned at both the entrance and the exit of the housing respectively. These are primarily safety features in order to minimize the chances of inadvertent or untimely introduction of a hollow object 45 into the housing. An electronic "eye" mechanism (not shown) also can be positioned at the entrance and exit for safety purposes. Preferably, the "eye" mechanism will open and close the safety gate, and stop the conveyor belt if an object enters the housing at an inappropriate time.

The method of this invention for treating the interior surfaces of hollow plastic objects for improving adhesive properties involves creating a partial vacuum in a hollow plastic object and drawing a conductive gas inside the object. The object then is positioned between a pair of electrodes spaced apart from each other with means for a source of electricity of sufficient intensity to produce an electrical discharge across the gap between the electrodes when the means is energized. This ionizes the conductive gas inside the object thereby increasing the surface tension/adhesive ability of the inner surfaces with polyurethane foam. Although polyurethane foam is discussed in the preferred embodiment, it will be understood that this invention can be adapted to any type of adhesion of a substance.

More particularly, a hollow plastic object 45 is placed on the lift platform 19 with fill openings in the object facing upward. If there are any openings which will not be used during the fill operations, they should be plugged, taped or closed by any other suitable means. The sealing head 5 is then placed (either manually or automatically) into the object opening to be used for charging of the object. A partial vacuum should be created inside the hollow object and a predetermined mixture of gases injected into the object. A mixture of between 81-100% argon and 19-0% oxygen is suggested, and a mixture of 95% argon and 5% oxygen is preferred. However, it will be understood that any suitable gas or gas mixture which is conductive can be used.

Once the object is successfully charged, the fill head 5 is quickly disengaged from the object 45 and a plug, tape or other suitable means is used to maintain a positive pressure therein. The gate is raised and the hydraulic lift is moved until it reaches the height of the conveyor belt. The object is then transferred, either by pushing or lifting, off of the lift platform and onto the conveyor. Once this is accomplished, the gate is closed. When the object starts to enter the housing 18, the gate is locked closed until the part clears the photoelectric "eye" beam at the entrance of the treatment machine. After the object has completely passed the entrance, the gate will unlock. As a safety precaution, if the gate is open when an object starts to enter the treating area, the conveyor will stop until the gate is closed. The hydraulic lift table 19 is then lowered to its initial position for receiving another object.

As the object passes between the first set of electrodes, the vertical electrical discharge ionizes the conductive gas inside the object. This ionization of the gas inside the hollow plastic object chemically and electrically interacts with the interior surfaces to increase the surface tension of the interior surfaces. Increasing the surface tension allows for better adhesion. As will be understood, surface tension or surface energy level is measured in dynes/cm$^2$. In order for adhesion to take place the two components to be adhered must be of at least equal surface tension level. However, due to the inaccuracies of testing surface tension levels, it is suggested that the surface to be adhered to is surface treated to a surface tension level of at least 10 dynes/cm$^2$ higher than the substance being applied (e.g., glue, coatings, inks, paint, foams). Therefore, it is preferred that testing of surface treatment be done before assembly line treatment of objects begin. It will be understood by those familiar in the art there are many factors to be considered in the treatment of the interior surface of an object such as whether the object is composed of pure plastic or a plastic with contaminants therein. Furthermore, the migratory additives in plastic can spoil the surface treatment.

Once the hollow object has passed through the first set of electrodes, it then passes between the second set of electrodes which further ionizes the gas in the object.

Those familiar in the art will understand that this ionization may not be directional, that the second pair of electrodes or pairs of electrode beyond two may not be necessary for complete treatment of the inside surfaces of the hollow plastic object. Conditions which will have an effect on this are the speed of the conveyor belt, the humidity in the tunnel, the number of parts being treated, the composition of the conductive gas, and the amount of impurities in the resin to name a few. After treatment of the object, it passes out of the housing and then a substance can be adhered to it in a suitable manner.

It will be understood by those familiar in the art that this invention also can be applied when the object (whether or not hollow) is placed in a container and a vacuum is created in the container and a conductive gas is drawn inside the container. The container and the object inside can then be treated as described above for adherence of a substance to it in a suitable manner.

It further will be understood that this apparatus and method may be used with any size object which needs to be treated and is limited only by the gap between the electrodes.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interrupted as illustrative and not in a limiting sense.

What is claimed is:

1. Apparatus for surface treating the interior surfaces of hollow plastic objects to improve the surface tension for increasing the adhesive properties of these surfaces comprising means for creating a partial vacuum in the object, means for drawing a conductive gas inside the object and maintaining a positive or negative pressure therein, a pair of electrodes spaced apart from each other, means including a source of electricity of sufficient intensity to produce ionization of the gas inside the hollow plastic object when the hollow plastic object is placed between the electrodes, means for positioning said electrodes in proper position with regards to the object, electrical conducting means connecting said electrodes and said source, and means for positioning the objects in the gap between said electrodes, said electrodes being apart from each other a sufficient distance to permit passage of the objects between them for ionization of the gas inside the object whereby the interior surfaces of the object are surface treated.

2. The apparatus of claim 1 wherein said means for creating a vacuum comprises a sealing head and vacuum generator.

3. The apparatus of claim 1 wherein said means for drawing a conductive gas inside the object comprise tanks of a gas or gas mixture, control valves and a sealing head.

4. The apparatus of claim 1 wherein said gas comprises a single gas or mixture of gases.

5. The apparatus of claim 4 wherein the mixture is between 81–100% argon and 19–0% oxygen.

6. The apparatus of claim 5 wherein the mixture is 95% argon and 5% oxygen.

7. Apparatus for treating the surfaces of plastic objects to improve the surface tension for increasing the adhesive properties of the surfaces comprising means for creating a partial vacuum around and in the object and to maintain a positive or negative pressure in the object, means for drawing a conductive gas around and in the object, a pair of electrodes spaced apart from each other, means including a source of electricity of sufficient intensity to produce ionization of the gas inside the hollow plastic object when the hollow plastic object is placed between the electrodes, means for positioning said electrodes in proper position with regards to the object, electrical conducting means connecting said electrodes and said source, and means for positioning the objects in the gap between said electrodes, said electrodes being apart from each other a sufficient distance to permit passage of the objects between them for ionization of the gas inside the object whereby the interior surfaces of the object are surface treated.

8. The method for treating the interior surface of hollow plastic objects to improve their adherency to and compatibility with another substance comprising the steps of:

creating a vacuum in the object;
drawing a conductive gas inside the object;
maintaining a positive or negative pressure in the object;
positioning the object between a pair of electrodes spaced apart from each other;
means including a source of electric current of sufficient intensity to produce an electrical discharge across the gap between said electrodes as said means is energized;
the conductive gas inside the object is ionized thereby increasing the adherency to and compatibility of the inner walls with another substance.

9. The method of claim 8 wherein said substance is a polyurethane foam.

10. The method of claim 8 wherein said gas comprises a single gas or mixture of gases.

11. The method of claim 10 wherein said mixture is between 81–100% argon and 19–0% oxygen.

12. The method of claim 10 wherein the mixture is 95% argon and 5% oxygen.

* * * * *